United States Patent
Nedkov et al.

(10) Patent No.: US 8,191,128 B2
(45) Date of Patent: May 29, 2012

(54) SYSTEMS AND METHODS FOR CONTROLLING ACCESS TO A PUBLIC DATA NETWORK FROM A VISITED ACCESS PROVIDER

(75) Inventors: Nicolas Nedkov, Toronto (CA); Spencer Wong, Caledon (CA); Brian Norman Smith, Burlington (CA)

(73) Assignee: BCE Inc., Verdun, Quebec (CA)

( * ) Notice: Subject to any disclaimer, the term of this patent is extended or adjusted under 35 U.S.C. 154(b) by 1774 days.

(21) Appl. No.: 10/996,439

(22) Filed: Nov. 26, 2004

(65) Prior Publication Data
US 2005/0198036 A1   Sep. 8, 2005

(30) Foreign Application Priority Data
Nov. 28, 2003  (CA) ..................... 2451313

(51) Int. Cl.
G06F 17/30 (2006.01)
G06F 7/04 (2006.01)
G06F 9/00 (2006.01)
G06F 21/00 (2006.01)
H04L 29/06 (2006.01)
H04L 9/32 (2006.01)

(52) U.S. Cl. ......... 726/9; 726/2; 726/5; 726/10; 726/12; 726/19; 713/161; 713/168; 713/182

(58) Field of Classification Search ............... 726/19, 726/27, 2, 5, 9, 10, 12; 713/161, 168, 182
See application file for complete search history.

(56) References Cited

U.S. PATENT DOCUMENTS

| | | | |
|---|---|---|---|
| 5,768,503 A * | 6/1998 | Olkin | 726/5 |
| 5,875,186 A | 2/1999 | Belanger et al. | |
| 5,905,736 A * | 5/1999 | Ronen et al. | 370/546 |
| 6,226,277 B1 | 5/2001 | Chuah | |
| 6,609,198 B1 * | 8/2003 | Wood et al. | 713/155 |
| 7,096,204 B1 * | 8/2006 | Chen et al. | 705/74 |
| 7,225,464 B2 * | 5/2007 | Satyavolu et al. | 726/10 |
| 7,424,732 B2 * | 9/2008 | Matsumoto et al. | 726/2 |
| 7,590,847 B2 * | 9/2009 | Jenisch et al. | 713/172 |

(Continued)

FOREIGN PATENT DOCUMENTS
WO   WO 01/84765 A2   11/2001

(Continued)

OTHER PUBLICATIONS

International Search Report of Application No. PCT/CA2004/002042 mailed on Mar. 18, 2005.

(Continued)

*Primary Examiner* — Mohammad Reza

(57) ABSTRACT

To allow a user to access a public data network from a region of service operated by a visited access provider, the visited provider is supplied with an identity of a credit provider. The user is redirected to the credit provider, resulting in establishment of a temporary connection with the credit provider. During this temporary connection, the user supplies original user credentials and, in return, receives substitute user credentials if the original user credentials are valid. The substitute user credentials are supplied to the visited provider, which proceeds to have the user authenticated by the credit provider on the basis of the substitute user credentials. In this way, the visited provider authenticates the user with the credit provider before allowing the user to access the public data network, but a secure exchange of the original user credentials between the user and the credit provider prevents unauthorized access to this information by the visited provider.

49 Claims, 7 Drawing Sheets

U.S. PATENT DOCUMENTS

| | | | |
|---|---|---|---|
| 2002/0034939 A1 | 3/2002 | Wenzel | |
| 2002/0035699 A1 | 3/2002 | Crosbie | |
| 2002/0066042 A1* | 5/2002 | Matsumoto et al. | 713/202 |
| 2002/0174335 A1 | 11/2002 | Zhang et al. | |
| 2003/0033518 A1 | 2/2003 | Faccin et al. | |
| 2003/0097584 A1* | 5/2003 | Haukka et al. | 713/200 |
| 2003/0120821 A1 | 6/2003 | Thermond et al. | |
| 2003/0145091 A1 | 7/2003 | Peng et al. | |
| 2003/0191964 A1 | 10/2003 | Satyavolu et al. | |
| 2003/0208562 A1* | 11/2003 | Hauck et al. | 709/219 |

FOREIGN PATENT DOCUMENTS

| | | |
|---|---|---|
| WO | WO 03/047294 A1 | 6/2003 |
| WO | WO 03/073240 A1 | 9/2003 |

OTHER PUBLICATIONS

"Localised Authentication for Inter-Network Roaming Across Wireless LANs" (Long et al.) Oct. 24, 2004, IEEE, vol. 151, No. 5, pp. 496-500 Whole Document.

Best Current Practices for Wireless Internet Service Provider (WISP) Roaming; Wi-Fi Alliance—Wireless ISP Roaming (WISPr); B.Anton-Gemtek Systems, Inc.; B. Bullock-iPass, Inc.; J. Short-Nomadix, Inc.; Release Date: Feb. 2003, version 1.0. (pp. 1-37).

Office Action mailed on Feb. 19, 2010 in connection with Canadian Patent Application 2,451,313, 2 pages.

* cited by examiner

SYSTEMS AND METHODS FOR CONTROLLING ACCESS TO A PUBLIC DATA NETWORK FROM A VISITED ACCESS PROVIDER

FIELD OF THE INVENTION

The present invention relates generally to telecommunications and, more specifically, to methods for controlling access to a public data network, such as the internet, from access points operated by different competitive entities.

BACKGROUND OF THE INVENTION

The availability of ubiquitous, wireless internet access is a simple design goal in theory, yet its implementation in practice is replete with business considerations that need to be addressed with advanced technical solutions. In particular, the increased desire for people to access the internet from their own computers where data resides locally requires an entirely different approach from the simplistic "internet cafés" that have sprouted into existence globally in recent years. To this end, the industry has seen the emergence of various standards, including IEEE 802.11b, known to those in the industry as "Wi-Fi". The reader is invited to consult http://www.wi-fi.org on the internet for further information on Wi-Fi as well as the Wi-Fi alliance, a nonprofit international association formed in 1999 to certify interoperability of wireless Local Area Network products based on IEEE 802.11 specification.

Since the emergence of the IEEE 802.11b specification in 1999, an increasing number of vendors have used this standard in producing Wi-Fi compliant wireless LAN (WLAN) products. Pioneers of high speed internet access have built WLAN "hotspots", which are basically zones of public internet access. Since it is difficult for a single service provider to build an infrastructure that offers global access to its subscribers, roaming between service providers is essential for delivering global access to customers. Roaming allows enterprises and service providers to enhance their employee connectivity and service offerings by expanding their footprint to include network access at Wi-Fi enabled hotspots.

In a roaming scenario, a wireless device (e.g. a laptop, PDA, etc.) moves to a hotspot not operated by its home access provider. It is here that registration of the device with the visited access provider and authorization of the access from the home access provider must take place. Conventional solutions require the user to supply their home login credentials to the visited access provider's authentication, authorization and accounting (AAA) server and this visited AAA server then validates the user's home login credentials by interacting with the home access provider.

Disadvantageously, a problem arises due to the visited AAA server having complete access to customer login information for customers utilizing a competitor as its access provider while roaming. This information can easily be abused. While clearly an issue amongst competing corporate entities providing internet access, this problem is expected to generate even greater concern as increasing numbers of smaller, independent enterprises begin to operate their own hotspots in the future, with few or no regulatory restrictions.

Against this background, there is a need to improve the security of the process by which a user having a business relationship with a home access provider obtains access to the Internet via a gateway operated by a visited access provider.

SUMMARY OF THE INVENTION

A first broad aspect of the present invention seeks to provide a method of controlling access to a public data network from a visited access provider. The method comprises receiving from a client device a message indicative of a request to access the public data network; supporting a temporary connection between the client device and a user-selected credit provider, the temporary connection comprising a transmission of substitute user credentials from the user-selected credit provider in response to transmission of original user credentials from the client device; receiving the substitute user credentials from the client device; communicating the substitute user credentials to the user-selected credit provider to authenticate the client device; and responsive to successful authentication of the client device by the user-selected credit provider on the basis of the substitute user credentials, authorizing the client device to access the public data network.

A second broad aspect of the present invention seeks to provide a network. The network comprises a network server entity adapted to receive from a client device a message indicative of a user-selected credit provider; and a gateway entity adapted to support a temporary connection between the client device and the user-selected credit provider, the temporary connection comprising a transmission of substitute user credentials from the user-selected credit provider in response to transmission of original user credentials from the client device. The network server entity is further adapted to receive the substitute user credentials from the client device. The network further comprises an authentication entity adapted to communicate the substitute user credentials to the user-selected credit provider to authenticate the client device. The network server entity is further adapted to authorize the client device to access the public data network in response to successful authentication of the client device by the user-selected credit provider on the basis of the substitute user credentials.

A third broad aspect of the present invention seeks to provide a network. The network comprises means for receiving from a client device a message indicative of a user-selected credit provider; means for supporting a temporary connection between the client device and the user-selected credit provider, the temporary connection comprising a transmission of substitute user credentials from the user-selected credit provider in response to transmission of original user credentials from the client device; means for receiving the substitute user credentials from the client device; means for communicating the substitute user credentials to the user-selected credit provider to authenticate the client device; and means for authorizing the client device to access the public data network in response to successful authentication of the client device by the user-selected credit provider on the basis of the substitute user credentials.

A fourth broad aspect of the present invention seeks to provide a method of authenticating users having a business relationship with a credit provider. The method comprises receiving original user credentials from a client device; sending to the client device substitute user credentials associated with the original user credentials; receiving the substitute user credentials from a visited provider of access to a public data network; authenticating the client device on the basis of the substitute user credentials; and responsive to successful authentication of the client device on the basis of the substitute user credentials, indicating to the visited provider of access to the public data network that the client device has been successfully authenticated.

A fifth broad aspect of the present invention seeks to provide a network. The network comprises a network server entity and an authentication entity. The network server entity is adapted to receive original user credentials from a client device; and send to the client device substitute user credentials associated with the original user credentials. The authentication entity is adapted to receive the substitute user credentials from a visited provider of access to a public data network; authenticate the client device on the basis of the substitute user credentials; and indicate to the visited provider of access to the public data network that the client device has been successfully authenticated in response to successful authentication of the client device on the basis of the substitute user credentials.

A sixth broad aspect of the present invention seeks to provide a network. The network comprises means for receiving original user credentials from a client device; means for sending to the client device substitute user credentials associated with the original user credentials; means for receiving the substitute user credentials from a visited provider of access to a public data network; means for authenticating the client device on the basis of the substitute user credentials; and means for responsive to successful authentication of the client device on the basis of the substitute user credentials, indicating to the visited provider of access to the public data network that the client device has been successfully authenticated.

A seventh broad aspect of the present invention seeks to provide a method of accessing a public data network from a region of service operated by a visited access provider. The method comprises supplying to the visited access provider an identity of a credit provider; establishing a temporary connection with the credit provider; responsive to supplying the credit provider with original user credentials provider during the temporary connection, receiving substitute user credentials from the credit provider during the temporary connection; and supplying the substitute user credentials to the visited access provider for authentication of the client device by the credit provider on the basis of the substitute user credentials.

An eighth broad aspect of the present invention seeks to provide an apparatus for accessing a public data network from a region of service operated by a visited access provider. The apparatus comprises means for supplying to the visited access provider an identity of a credit provider; means for establishing a temporary connection with the credit provider; means for receiving substitute user credentials from the credit provider during the temporary connection in response to supplying the credit provider with original user credentials provider during the temporary connection; and means for supplying the substitute user credentials to the visited access provider for authentication of the client device by the credit provider on the basis of the substitute user credentials.

A ninth broad aspect of the present invention seeks to provide a graphical user interface for guiding a user through a process of accessing a public data network from a region of service operated by a visited access provider. The graphical user interface comprises a browser capable of interfacing with the user, as well as a control entity. The control entity is operative to output via the browser content from the visited access provider; in response to identification via the browser of a credit provider, to output via the browser content from the credit provider; in response to identification via the browser of user credentials of a user having a business relationship with the credit provider, to access content of user-selected locations on the public data network.

A tenth broad aspect of the present invention seeks to provide a computer program product for use with a client device in accessing a public data network from a region of service operated by a visited access provider. The computer program product comprises a computer usable medium having computer readable program code thereon. The computer readable program code includes program code for implementing a browser to interface with the user; program code for outputting via the browser content from the visited access provider; program code for outputting via the browser content from a credit provider in response to receiving via the browser an identification of the credit provider; and program code for accessing via the browser content of user-selected locations on the public data network in response to receiving via the browser an identification of user credentials of a user having a business relationship with the credit provider.

These and other aspects and features of the present invention will now become apparent to those of ordinary skill in the art upon review of the following description of specific embodiments of the invention in conjunction with the accompanying drawings.

DETAILED DESCRIPTION OF THE EMBODIMENTS

Figure 1A:
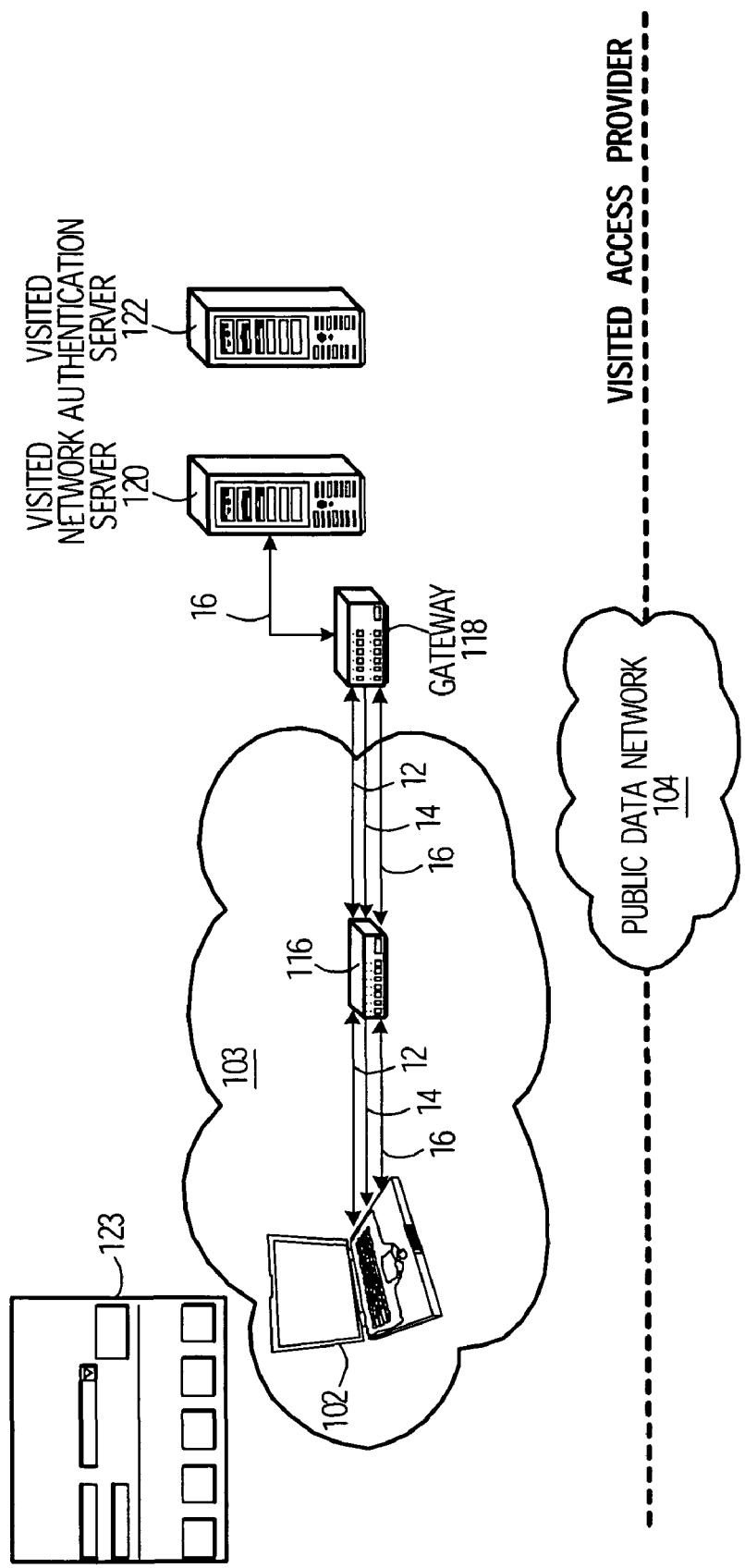
FIGS. 1A through 1F show different steps in a process for authenticating a user of a visited provider of access to a public data network.

FIG. 1A shows a client device 102 that has entered a region 103 of service to a public data network 104. The public data network 104 could be the internet or, generally, any network accessible at multiple access points operated by different "access providers". In specific circumstances, the client device 102 may be a laptop, PDA, handheld computing device, tablet PC, or any other wireless device. The client device 102 could also be a mobile telephone, provided it is equipped with a suitable network interface other than, or in addition to, a standard wireless interface. The user of the client device 102 is assumed to have a business relationship with a "home" access provider. In an example, the user may be a mobile telephone network subscriber, an internet access subscriber, a cable subscriber, local telephone service subscriber, power company subscriber, etc.

In the roaming scenario illustrated in FIG. 1A, access to the public data network 104 from within the region 103 is controlled by a visited provider of public data network access. Accordingly, such access provider may be termed a "visited" access provider. The visited access provider is shown as comprising a physical access module 116, a gateway 118, a visited network server 120 (e.g., a web server) and a visited authentication server 122. A non-limiting example of an authentication server 122 is an identity system or database capable of handling the RADIUS protocol. An example is the LDAP database (or another server) that is capable of communicating in accordance with the RADIUS protocol. For simplicity, communication links between the physical access module 116, the gateway 118, the visited network server 120 and the visited authentication server 122 have been omitted from the drawing.

In a specific embodiment, the physical access module 116 may be implemented as a bi-directional radio frequency transceiver, adapted to exchange wireless signals with the client device 102. It is within the scope of the present invention to exchange wireless signals conforming with the IEEE 802.11 standards, although this is not a requirement of the present invention. Other types of signals that could be exchanged between the client device 102 and the physical access module 116 include free space optical signals, infrared signals, electrical signals over a twisted pair or coaxial cable, optical signals over an optical waveguide, etc.

The physical access module 116 is connected to the gateway 118, which interfaces with the public data network 104. The gateway 118 provides packet processing and other low-level processing features. For instance, the gateway 118 is capable of recognizing when a client device (e.g., client device 102) is attempting to access the public data network 104. The gateway 118 has the capability to respond by redirecting the client device towards the visited network server 120.

In a specific embodiment, the visited network server 120 may be a web server, which provides the capability of exchanging interactive web content with a connection endpoint such as the client device 102. The visited network server 120 also has the ability to instruct the gateway 118 to release (i.e., enable) or abort a session between a client device (e.g., client device 102) across the public data network 104. The visited network server 120 also interacts with the visited authentication server 122 by providing to it user credentials received from various client devices.

The visited authentication server 122 is adapted to receive such credentials and to validate them by communicating with authentication servers associated with other access providers. The configuration of the visited authentication server 122 may be standard and it may abide by well-known protocols such as the RADIUS protocol. For more information on usage of the RADIUS protocol by the authentication server 122, the reader is invited to consult the Internet Engineering Task Force's (IETF) Request for Comments (RFC) 2865, RFC 2866 and RFCs subsequent thereto, hereby incorporated by reference herein.

Figure 1B:
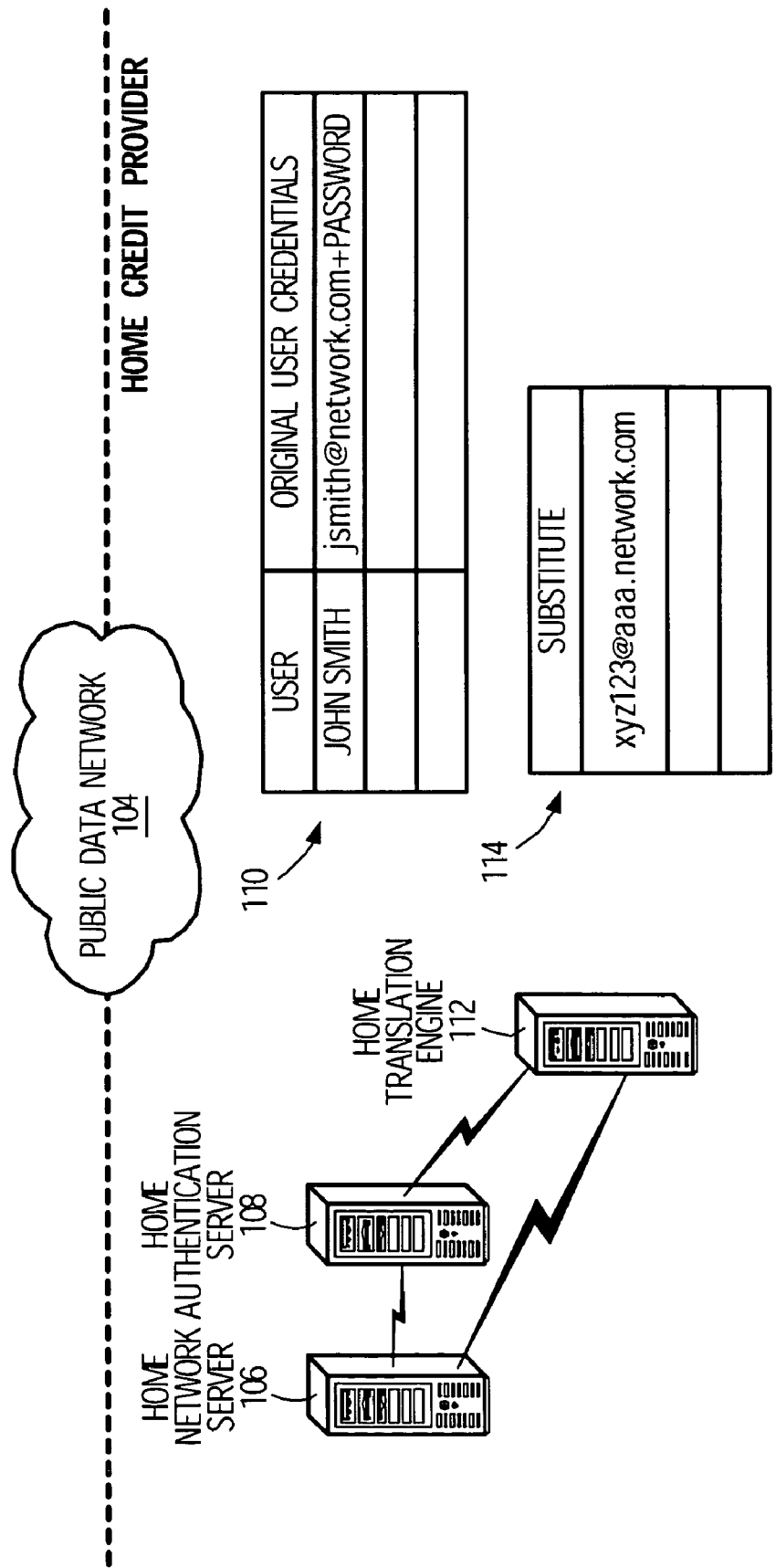

FIG. 1B shows portions of a "home" credit provider with which the user of client device 102 has a business relationship. It is assumed that the home credit provider has access to the public data network 104, e.g., by way of a web server. In an embodiment, the home credit provider is an access provider which provides internet access to client devices 102 within a specific geographic region, similarly to the visited access provider. This would be the case, for example, where the home credit provider is a wireless operator. However, in alternative embodiments, the home credit provider may a utility (e.g., power company, telephone company, gas company), a credit card company, a bank, a loan agency or any source of verifiable credit that the client device 102 can access via the public data network 104.

Generally speaking, the home credit provider comprises a home network server 106 and a home authentication server 108. For simplicity, communication links between the home network server 106 and the home authentication server 108 have been omitted from the drawing. Also for simplicity, gateways linking the home network server 106 to other access providers (e.g., via the public data network 104) are not shown.

In a specific example, the home network server 106 may be a web server, capable of interactively exchanging web content with a connection endpoint. The home network server 106 is connected to the home authentication server 108, which is responsible for authenticating users on the basis of received user credentials. In a specific embodiment, the home authentication server 108 maintains a database 110 of user credentials associated with each of a plurality of authorized users. For simplicity, the database 110 may be referred to as a "database of authorized users". When user credentials are supplied to the home authentication server 108, the home authentication server 108 attempts to validate the received user credentials by verifying whether they appear in the database 110 of authorized users. If they do indeed appear in the database 110 of authorized users, the associated user with these user credentials is said to be successfully authenticated and if they do not appear in the database 110 of authorized users, no associated user is successfully authenticated and it is said that authentication has been unsuccessful.

In accordance with an embodiment of the present invention, a functional component associated with the authentication server 108 is a home translation engine 112. The home translation engine 112 may be a physical or logical entity and it may be integral with or separate from the hardware or software of the authentication server 108 or the home network server 106. In a specific embodiment, the translation engine 112 maintains a database 114 of "substitute" user credentials. The translation engine 112 has suitable circuitry, software and/or control logic for generating substitute user credentials associated with received original user credentials. Specifically, when supplied with original user credentials and prompted to generate substitute user credentials, the translation engine 112 can either generate arbitrary substitute user credentials or it may derive the substitute user credentials on the basis of the original user credentials by performing a particular algorithmic function. The substitute user credentials are then stored in the database 114. Another role of the translation engine 112 is to verify whether a given set of received substitute credentials appears in the database 114.

The process of controlling access by the client device 102 to the public data network 104 can best be described as a sequence of message streams with reference to FIG. 1A, FIGS. 1C-1F and FIG. 2. The message streams represent a logical flow of information. When the flow of information involves entities operated by the same access provider, this is illustrated by solid arrows; where the flow of information involves entities operated by different access providers, this is indicated by dashed arrows.

To begin, the client device 102 sends a message stream 12 in an attempt to access the public data network 104. The message stream 12 is received at the gateway 118 through the physical access module 116. In a non-limiting example, the message stream 12 may identify the location of a web page (e.g., by way of an IP address) that the user wishes to access. The IP address of the web page may be supplied in response to a DNS query following text entry of a web page in a web browser operating as a graphical user interface. Alternatively, in another non-limiting example, the browser operating on the client device 102 can be pre-programmed to attempt to access a default home page. In yet other instances, the browser could simply send a message to the gateway 118 indicative that the client device 102 is attempting to access the public data network 104, without necessarily specifying any given web address. It should also be understood that graphical user interfaces other than web browsers are within the scope of the present invention.

Upon recognizing the attempt of the client device 102 to access the public data network 104, the gateway 118 sends a message stream 14 to the client device 102 redirecting it to the visited network server 120. In a non-limiting example embodiment, this can be done by way of an HTTP redirect which supplies an address of the visited network server 120. Thus, a new message stream 16 begins to be exchanged between the client device 102 and the visited network server 120. In a specific embodiment, the visited network server 120 is a web server. Thus, the message stream 16 causes a login web page 123 to be displayed on the client device 102 and interactive exchange of web content takes place between the two end points of the connection, namely the client device 102 and the visited web server 120. In a specific example embodiment of the login web page 123, there is provided an array of buttons representative of various candidate credit providers. If roaming is to successfully take place, the candidate credit providers should include the user's home credit provider. The user is prompted to select his or her home credit provider and this may be done in a variety of ways including but not limited to pushing one of the buttons using a mouse or stylus, the typing of a realm from a keyboard or the selection of a menu item with a digital pen. Other selection techniques will be known to those of ordinary skill in the art.

Figure 1C:
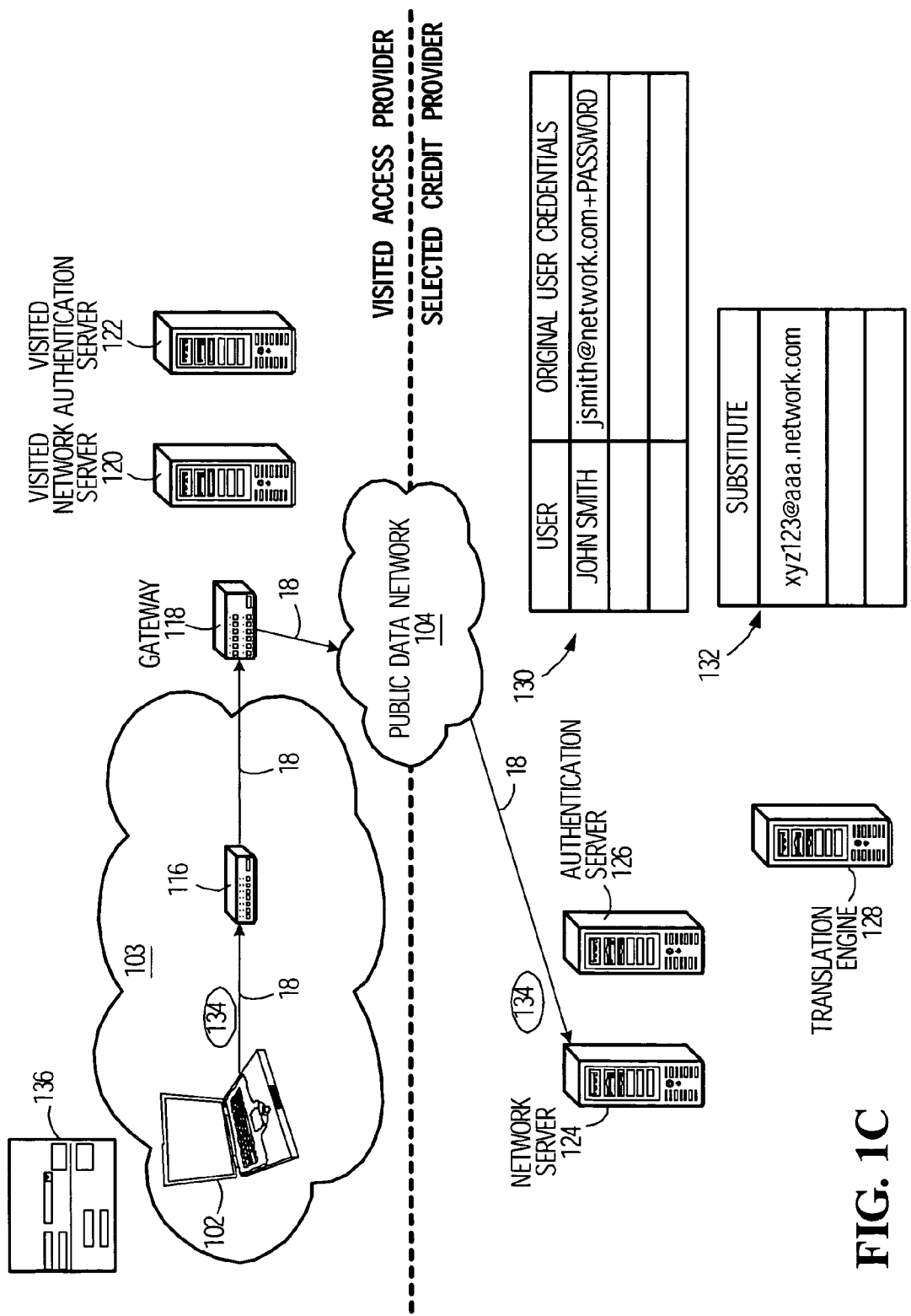

At this point, the user is assumed to have identified a credit provider, hereinafter referred to as the user-selected credit provider. It is noted that the user-selected credit provider may not always be the home credit provider for the user in question, especially when the user's intentions are malicious. With reference now to FIG. 1C, the visited network server 120, upon receipt of the user's identification of a credit provider, now directs the client device 102 to a network server 124 in the user-selected credit provider, thus establishing a connection between these two entities. In the specific embodiment where the network server 124 is a web server, the connection carries a message stream 18 that causes a web page 136 to be displayed on the client device 102, followed by interactive exchange of information between the two end points of the connection, namely the client device 102 and the web server 124 operated by the user-selected credit provider.

The message stream 18 allows the user (by way of the client device 102) to supply original user credentials 134 to the network server 124 of the user-selected credit provider. For example, the original user credentials 134 may comprise a username, a realm and a password, although various other formats for the original user credentials will be known to those of ordinary skill in the art. In a specific case, the original user credentials may be entered on the web page 136 as "jsmith@network.com" with a corresponding password, where "jsmith" is known as the username and "network.com" is known as the realm. In another embodiment, the original user credentials 134 comprise an account number (e.g., based on address, home telephone number, driver's license, etc.) and a password. In still other embodiments, the original user credentials 134 comprise a bank account number and a personal identification number. In yet another embodiment, the original user credentials 134 comprise a credit card number and an expiry date or, alternatively, a cardholder name and a credit card number and optionally the expiry date.

While in some embodiments, the original user credentials 134 are entered by the user, in other embodiments, the original user credentials 134 may be supplied to the network server 124 with little or no intervention from the user. For example, by enabling a memory feature in the browser, the original user credentials 134 may be submitted to the network server 124 upon mere confirmation by the user by a single action, such as the click of a mouse or the stroke of a key or the touch of a finger or stylus, etc. In other instances, the browser operating on the client device 102 may be programmed to enter predetermined original user credentials 134 without any input from the user.

It is noted that the connection between the client device 102 and the network server 124 may physically pass through the physical access module 116, the gateway 118, the public data network 104 and, most typically, a gateway (not shown) operated by the user-selected credit provider. Advantageously, the client device 102 and the network server 124 of the user-selected credit provider can cooperate to make the message stream 18 secure and, in particular, impenetrable by the visited network server 120. In other words, the integrity of the original user credentials 134 supplied by the client device 102 to the network server 124 of the user-selected credit provider can be safeguarded. An example of a secure connection, not to be construed as a limiting example, is an SSL (secure socket layer) connection.

Figure 1D:
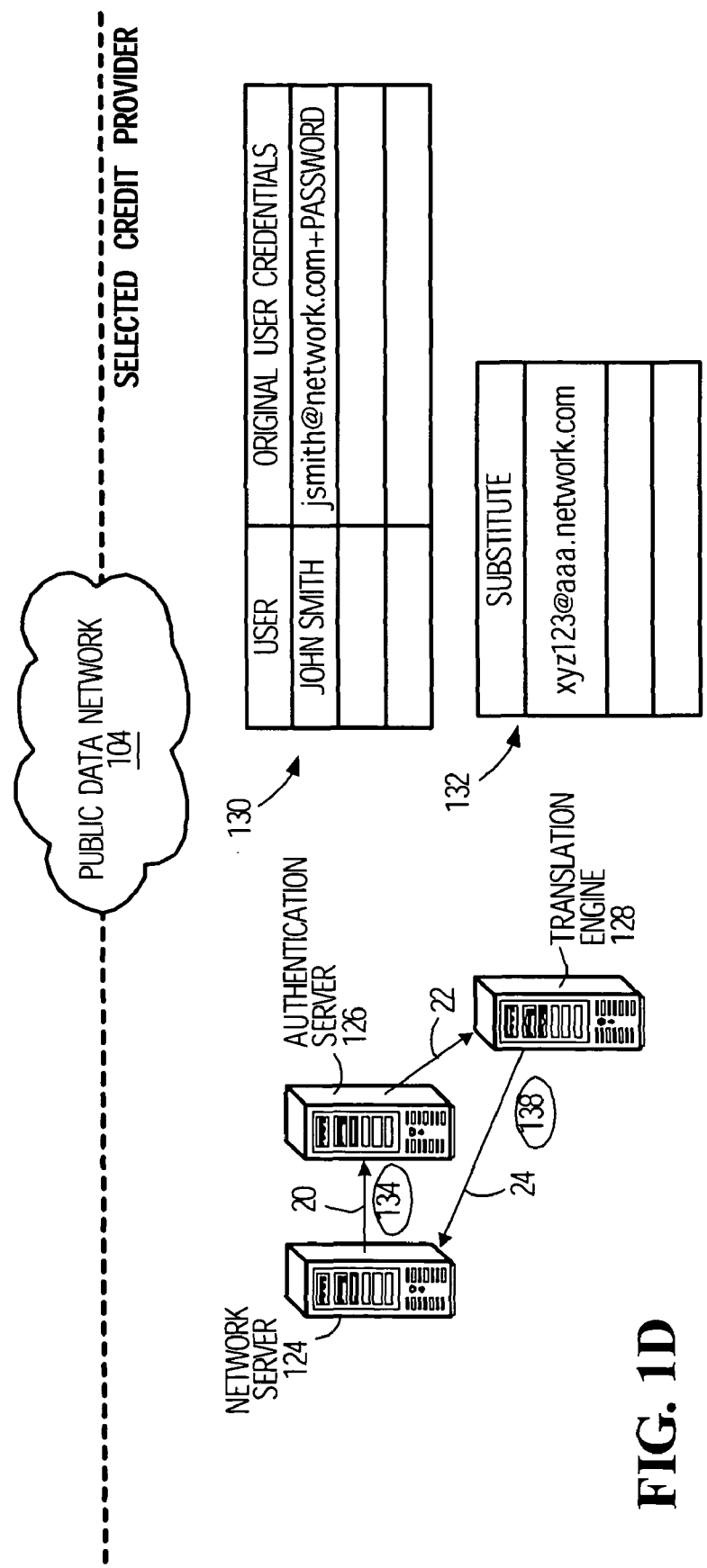

Reference is now made to FIG. 1D, which shows the steps in a procedure performed at the network server 124 of the user-selected credit provider upon receipt of the original user credentials 134. As previously mentioned, the access provider identified by the user may or may not be the home network server 106. Accordingly, to keep the discussion as general as possible, the network server 124 is shown as communicating with a generic authentication server 126 (not necessarily the home authentication server 108), which in turn is associated with a generic translation engine 128 (not necessarily the home translation engine 112). The authentication server has access to a database 130 of authorized users (not necessarily the database 110 of authorized users) and the translation engine 128 has access to a database 132 (not necessarily database 114). The network server 124, authentication server 126, translation engine 128, database 130 of authorized users and database 132 mirror similar entities in the home credit provider and, in fact, will correspond to those entities when the user-selected credit provider is the home credit provider for the user in question.

A first step in the procedure is for the network server 124 to establish a message stream 20 with the authentication server 126 in order to communicate the original user credentials 134 in an initial authentication phase. Upon receipt of the original user credentials 134, the authentication server 126 consults its database 130 of authorized users in an attempt to locate the original user credentials 134. If, indeed, the original user credentials 134 are found in the database 130 of authorized users, then the authentication server 126 will deem the authentication to have been successful. At this point, the authentication server 126 provides the original user credentials to the translation engine 128 and commands it to generate substitute user credentials. This command is represented by message stream 22. The translation engine 128 responds by generating a set of substitute user credentials 138 and storing them in the database 132 for future reference as will be seen from the discussion to follow. Message stream 24 represents the return of the substitute user credentials 138 to the network server 124.

It is to be noted that the substitute user credentials 138 may or may not be in a format resembling the original user credentials 134. For example, the substitute user credentials 138 may also comprise a different username, the same realm as the original user credentials and a different password. In another example, the substitute user credentials 138 may comprise an alphanumeric string that is derived from the username and password of the original user credentials 134, as well as an indication of the user-selected credit provider, but no password. In a further example, the substitute user credentials 138 may include an alphanumeric string and a realm indicative of the fact that the credentials are substitute in nature. This may be useful for corporate entities having subscribers from multiple realms and wishing to enable seamless roaming to users from all such realms by providing a common realm used for the specific purposes of authenticating subscribers. In yet another example, the substitute user credentials 138 may include an alphanumeric string, an indication of the user-selected credit provider and an indication as to whether authentication was performed or whether it was successful. In still another example, the substitute user credentials 138 may take on a random value that is uncorrelated with the original user credentials 134, in addition to an indication of the user-selected credit provider. In many cases, it will be desirable to ensure that the original user credentials 134 are indecipherable from the substitute user credentials 138.

Figure 1E:
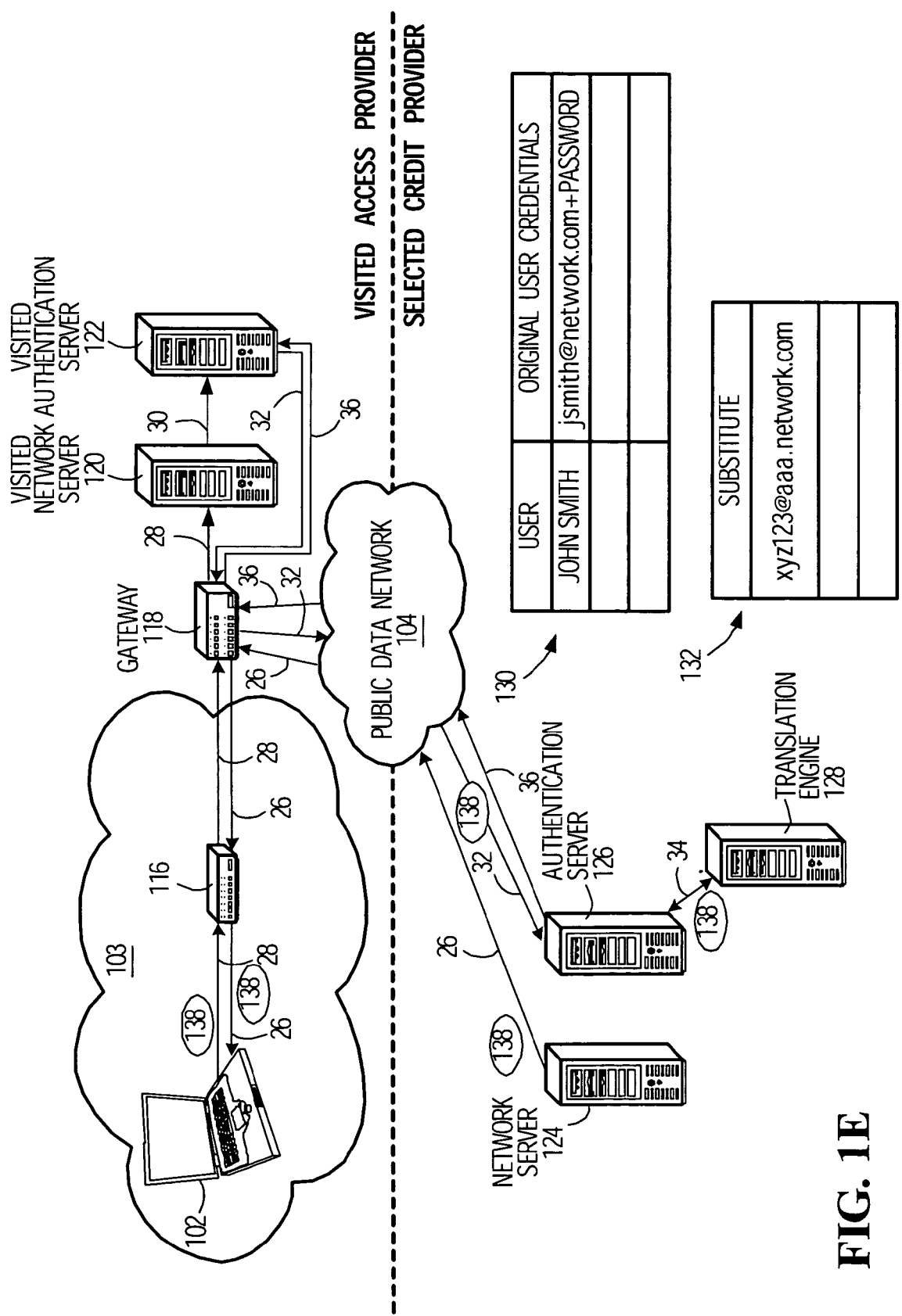

Reference is now made to FIG. 1E, which represents the occurrence of events after the network server 124 receives the substitute credentials 138 from the translation engine 128. The network server 124 operated by the user-selected credit provider sends to the client device 102 the substitute user credentials 138 as part of a message stream 26, which is in fact carried along the same connection as the message stream 18. In a specific non-limiting example, the substitute user credentials 138 may be forwarded as a cookie or as URL parameters. (It is noted that for authorized users, the network server 124 of the user-selected credit provider will correspond to the home network server 106).

As represented by message stream 28, the client device 102 then forwards the substitute user credentials 138 to the visited network server 120. It should be noted that the substitute user credentials 138 may or may not be made visible to the user of the client device 102 prior to their transmission to the visited network server 120. In other words, it is within the scope of the invention for the substitute user credentials 138 to be forwarded automatically to the visited network server 120 upon receipt from the network server 124 in a transparent fashion, i.e., without requiring user input. This can be achieved using standard parameter passing between web pages 123 and 136. The transparent transmission of the substitute user credentials 138 to the visited network server 120 increases convenience from the user's point of view since no additional data entry by the user is required.

Upon receipt of the substitute user credentials 138 at the visited network server 120, an authentication procedure is initiated. In one implementation, the visited network server 120 provides a message stream 30 to the visited authentication server 122, where the message stream 30 contains the substitute user credentials 138. By way of non-limiting example embodiment, the message stream 30 may take the form of a RADIUS authentication request. Other standards-based and proprietary messages are within the scope of the present invention. In an alternative implementation, the message stream 30 actually passes through the gateway 118 on its way from the visited network server 120 to the visited authentication server 122. In this alternative implementation, the gateway 118 is responsible for originating a RADIUS authentication request (or other standards-based or proprietary message) to the visited authentication server 122.

In response, the visited authentication server 122 initiates an authentication request with the authentication server 126 of the user-selected credit provider. The authentication server 122 knows that it needs to access the authentication server 126 based on a parameter of the substitute user credentials 138, such as the realm. It is assumed that the visited access provider and the user-selected credit provider have an already existing roaming relationship, including authentication server peering. In an example, this would allow the visited access provider to bill the home credit provider for the use of its network. This translates into roaming charges on the user's bill. The initiation of the authentication request with the authentication server 126 is represented by a message stream 32.

Upon receipt of the substitute user credentials at the authentication server 126, the authentication server 126 recognizes that the credentials being passed to it are substitute in nature. Myriad ways exist in order to allow the authentication server 126 to recognize that the credentials it has received are substitute in nature. For example, as indicated above, the realm forming part of the substitute user credentials 138 may identify the substitute nature of the credentials. Specifically, in the illustrated example, the realm "aaa.network.com" can provide a clear indication to the authentication server 128 in the "network.com" realm that the credentials being received are substitute user credentials.

In an example implementation, upon receipt of the substitute user credentials 138, the authentication server 126 forwards these to the translation engine 128 in the form of message stream 24. The translation engine 128 searches for the substitute user credentials 138 in its database 132 of previously authenticated users. In this embodiment, the substitute user credentials 138 are assumed to have been previously generated as a result of successful authentication of the user on the basis of the original user credentials. Therefore, the database 132 is guaranteed to contain the substitute user credentials 138 and thus a match is guaranteed to be found. This allows the visited authentication server 122 and the authentication server 126 to agree on the financial and other terms pertaining to the roaming operation. The authentication server 126 subsequently issues a message stream 36 which provides the visited authentication server 122 with an indication that the authentication has been successful. Assuming such to be the case, the message stream 36 may take the form of a RADIUS authentication accept message, for example.

Figure 1F:
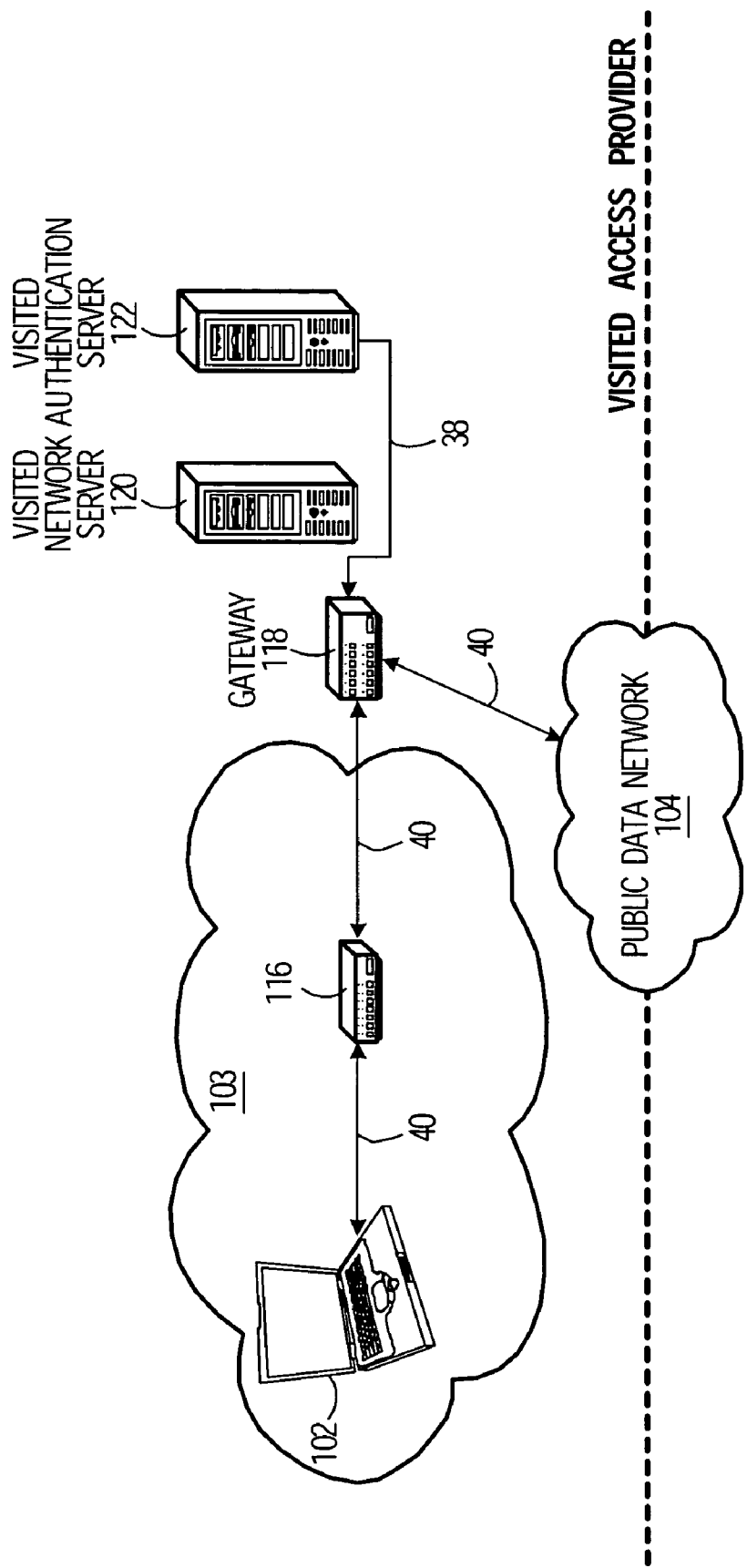
Figure 2:
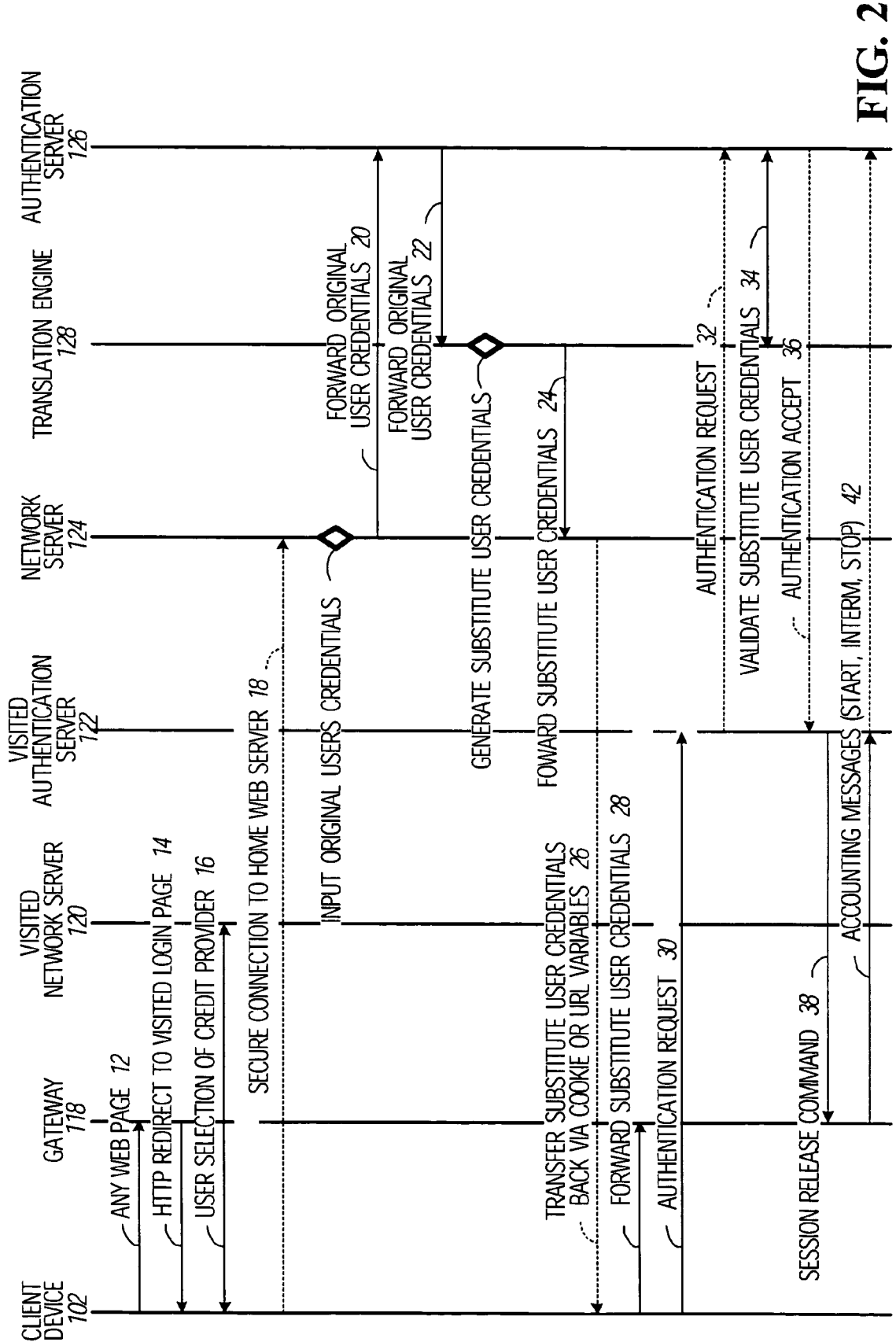
FIG. 2 is a diagram illustrating the flow of messages exchanged between different entities in FIGS. 1A through 1F.

Reference is now made to FIG. 1F, which assumes that successful authentication of the client device 102 on the basis of the substitute user credentials 138 has taken place. A message stream 38 represents the visited authentication server 122 informing the gateway 118, wither directly or via the network server 120 (depending on the particular implementation) that the client device 102 can be allowed to access the public data network 104. In a specific embodiment, this can be effected by way of a standards0based (XML, etc.) or proprietary "Session Release" command, resulting in a connection 40 between the client device 102 and desired locations in the public data network 104. The visited authentication server 122 now monitors the status of the user's connection 40 and is informed of its termination by the gateway 118. In a specific example, the gateway 118 transmits to the visited authentication server 122 accounting messages 42 (e.g., RADIUS messages such as Start, Interim and Stop), which are then processed by the visited authentication server 122 and communicated, as appropriate, to the authentication server 126 (which is actually the home authentication server 108, since authentication was successful).

From the above, it will be appreciated the connection between the client device 102 and the network server 124 of the user-selected credit provider allow the client device 102 to communicate its original user credentials securely with the user-selected credit provider, typically the home credit provider. Thus, the nature of the connection that supports the message streams 18, 26 is temporary, and its duration or flow characteristics (e.g., number of bytes of information exchanged) may be monitored by the gateway 118 and/or the visited network server 120. If the duration or traffic flow exceeds certain pre-set parameters, the gateway 118 or the visited network server 120 may terminate the connection. Such an action may be taken in order to prevent abuse of the temporary connection by the end user 102 in conspiracy with the home credit provider to escape roaming charges.

Also, the above has mostly considered the case where authentication of the client device 102 by the authentication server 126 in the user-selected credit provider was successful, which implies that the user-selected credit provider is the home credit provider. However, unsuccessful authentication is possible, e.g., in those cases where the user-selected credit provider is not the home credit provider. Unsuccessful authentication is detected by the authentication server 126. In response, the authentication server 126 may deny access immediately or may allow the client device 102 one or more additional chances to enter a new set of original user credentials 134 before truly denying access. Those skilled in the art will appreciate that variations of the above sequence of events may be made without departing from the scope of the present invention. For example, in one specific variant, upon receipt of the original user credentials 134 via message stream 18, the network server 124 does not forward the original user credentials 124 to the authentication server 126 for authentication. Rather, the network server 124 provides the original user credentials 134 directly to the translation engine 128, bypassing the authentication server 126 altogether. This causes the translation engine 128 to generate the substitute user credentials 138 without regard to whether the original user credentials 134 are valid or not. Under this variant, the substitute user credentials 138 are stored in the database 132 in association with the original user credentials 134, for later authentication of the client device 102. It is noted that under this variant, message streams 20 and 22 are eliminated and message stream 24 (between the network server 124 and the translation engine 128) becomes bi-directional.

Upon receipt of the substitute user credentials 138 via message stream 32, the authentication server 126 forwards these to the translation engine 128, which searches for the substitute user credentials 138 in the database. Recall that the substitute user credentials 138 are assumed to have been previously generated regardless of whether authentication of the user on the basis of the original user credentials would have been successful or unsuccessful. Therefore, the database 132 is guaranteed to contain the substitute user credentials 138 and, moreover, a corresponding set of original user credentials 134 will be found. By consulting the database 132, the translation engine 128 thus obtains the original user credentials 134 associated with the substitute user credentials 138. The translation engine 128 then provides, via message stream 34, the original user credentials 134 to the authentication server 126 for authentication. At this stage, the authentication server 126, for the first time, validates the original user credentials 134 by consulting the database 130 of authorized users. Assuming that authentication is successful, the visited authentication server 122 and the authentication server 126 agree on the financial and other terms pertaining to the roaming operation. If the authentication is unsuccessful, the authentication server 126 may deny access immediately or may allow the client device 102 one or more additional chances to enter a new set of original user credentials 134 before truly denying access.

Those skilled in the art will also appreciate that the authentication server 126 and the translation engine 128 may be separate entities, each with access to their own separate, respective databases 130, 132. On the other hand, the authentication server 126 and the translation engine 128 may constitute a single entity, with a single database that includes both original and substitute user credentials for each authorized user. Treating the authentication server 126 and the translation engine 128 as separate entities may be advantageous in a business environment where the authentication server 126 belongs to a corporate entity different from the translation engine 128. Specifically, consider the case where multiple access providers rely on a common, trustworthy, third-party "clearinghouse". Under such a business model, the clearinghouse provides original-to-substitute and substitute-to-original user credential translation services for various access providers. Whenever a given credit provider receives original user credentials, these are sent to the clearinghouse for translation into substitute user credentials, possibly by selection from amongst a pool of substitute (i.e., temporary) credentials. Conversely, when a given credit provider needs to authenticate a user on the basis of substitute user credentials, these are sent to the clearinghouse, which returns the original user credentials, if they exist.

Moreover, those skilled in the art will appreciate that a credit provider may, at the same time, act as a home credit provider with respect to a first user, a visited access provider with respect to a second user, and a user-selected credit provider with respect to a third user. Thus, when the credit provider also acts as an access provider, it will be understood that the designation of a particular access provider as "home", "visited" or "user-selected" will change, depending on the user in question being authenticated. Thus, the term "home", "visited" or "user-selected" is not intended to designate a particular "type" of access provider, rather a role of the access provider in relation to the user whose credentials are being authenticated.

Those skilled in the art will further appreciate that the gateway 118, the visited network server 120 and the visited authentication server 122 represent logically separate functions, but not necessarily separate physical devices, i.e., any combination of these logical functions could be performed by a single physical device. Likewise, the network server 124, the authentication server 126 and the translation engine 128 represent logically separate functions, but not necessarily separate physical devices, i.e., any combination of these logical functions could be performed by a single physical device. Similarly, the home network server 106, the home authentication server and the home translation engine 112 represent logically separate functions, but not necessarily separate physical devices, i.e., any combination of these logical functions could be performed by a single physical device.

Also, it should be appreciated that the HTTP (hypertext transfer protocol) redirection mechanism described herein above is not to be construed as a limitation of the present invention. Other ways of redirecting the client device 102 to a different location than the one initially sought are within the scope of the invention and may be based on protocols such as FTP (file transfer protocol), IP sec, SMTP (simple mail transfer protocol), etc.

Those skilled in the art will also appreciate that in some embodiments, the functionality of the network servers 106, 120, 124, authentication servers 108, 122, 126, gateway 118 and translation engines 112, 128 may be implemented as pre-programmed hardware or firmware elements (e.g., application specific integrated circuits (ASICs), electrically erasable programmable read-only memories (EEPROMs), etc.), or other related components. In other embodiments, the above entities may be implemented as an arithmetic and logic unit (ALU) having access to a code memory (not shown) which stores program instructions for the operation of the ALU. The program instructions could be stored on a medium which is fixed, tangible and readable directly by the entity in question, (e.g., removable diskette, CD-ROM, ROM, or fixed disk), or the program instructions could be stored remotely but transmittable to the entity in question via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

While specific embodiments of the present invention have been described and illustrated, it will be apparent to those skilled in the art that numerous modifications and variations can be made without departing from the scope of the invention as defined in the appended claims.

What is claimed is:

1. A method of controlling access to a data network from a visited access provider, comprising
   the visited access provider receiving from a client device a message indicative of a request to access the data network;
   the visited access provider supporting a temporary connection between the client device and a credit provider, the temporary connection comprising a transmission of substitute user credentials from the credit provider in response to transmission of original user credentials from the client device, wherein supporting the temporary connection further comprises redirecting the client device to the credit provider in response to receiving data indicative of the credit provider from the client device;
   the visited access provider receiving the substitute user credentials from the client device;
   the visited access provider communicating the substitute user credentials to the credit provider to authenticate the client device;
   responsive to successful authentication of the client device by the credit provider on the basis of the substitute user credentials, the visited access provider authorizing the client device to access the data network;
   wherein the temporary connection is secured to prevent the visited access provider from determining the original user credentials transmitted by the client device.

2. The method defined in claim 1, wherein receiving from the client device the message indicative of the request to access the data network comprises receiving an identity of a Web page attempted to be accessed by a browser on the client device.

3. The method defined in claim 1, further comprising, prior to supporting:
   identifying to the client device at least one candidate credit provider including said credit provider.

4. The method defined in claim 3, wherein supporting is performed responsive to receipt from the client device of data indicative of a selected one of the at least one candidate credit provider.

5. The method defined in claim 1, wherein supporting is performed responsive to receipt from the client device of data indicative of the credit provider.

6. The method defined in claim 5, further comprising:
   causing the client device to establish the temporary connection with the credit provider.

7. The method defined in claim 5, further comprising:
   causing the client device to establish the temporary connection with the credit provider over the data network.

8. The method defined in claim 7, wherein causing the client device to establish the temporary connection with the credit provider over the data network comprises redirecting the client device to an Internet Protocol (IP) address associated with the credit provider.

9. The method defined in claim 7, further comprising:
   terminating the temporary connection after the transmission of a pre-determined amount of data over the temporary connection.

10. The method defined in claim 7, further comprising:
    terminating the temporary connection after a pre-determined duration.

11. The method defined in claim 7, further comprising:
    responsive to unsuccessful authentication of the client device by the credit provider on the basis of the substitute credentials, communicating to the client device an indication of the unsuccessful authentication.

12. The method defined in claim 11, wherein the original user credentials comprise a user name, a realm and a password.

13. The method defined in claim 11, wherein the original user credentials comprise a user name and a credit card number.

14. The method defined in claim 11, wherein the original user credentials comprise an account number and a personal identification number.

15. The method defined in claim 11, wherein the substitute user credentials comprise a user name and a realm.

16. The method defined in claim 15, wherein the original user credentials are characterized by being indecipherable from the substitute user credentials.

17. A network, comprising:
    a network server entity adapted to receive from a client device a message indicative of a credit provider;
    a gateway entity adapted to support a temporary connection between the client device and the credit provider via the network server entity, the temporary connection comprising a transmission of substitute user credentials from the credit provider in response to transmission of original user credentials from the client device, the temporary connection being secured to prevent the network server entity from determining the original user credentials transmitted by the client device, wherein to support the temporary connection, the gateway is further adapted to redirect the client device to the credit provider in response to receiving the message indicative of the credit provider from the client device;
    the network server entity being further adapted to receive the substitute user credentials from the client device;
    an authentication entity adapted to communicate the substitute user credentials to the credit provider to authenticate the client device;
    the network server entity being further adapted to authorize the client device to access the data network in response to successful authentication of the client device by the credit provider on the basis of the substitute user credentials.

18. The network defined in claim 17, wherein the network server entity is a web server.

19. A network, comprising:
    server means for receiving from a client device a message indicative of a credit provider;
    means for supporting a temporary connection between the client device and the credit provider via the server means, the temporary connection comprising a transmission of substitute user credentials from the credit provider in response to transmission of original user credentials from the client device, the temporary connection being secured to prevent the server means from determining the original user credentials transmitted by the client device, wherein supporting the temporary connection further comprises redirecting the client device to the credit provider in response to receiving the message indicative of the credit provider from the client device;
    means for receiving the substitute user credentials from the client device;
    means for communicating the substitute user credentials to the credit provider to authenticate the client device;
    means for authorizing the client device to access the data network in response to successful authentication of the client device by the credit provider on the basis of the substitute user credentials.

20. A method of authenticating users having a business relationship with a credit provider, comprising:
- receiving original user credentials from a client device over a temporary connection that passes through a visited provider of access to a data network, the temporary connection being secured to prevent the visited provider of access from determining the original user credentials transmitted by the client device, the client device being redirected to the credit provider in response to the visited provider of access receiving a message indicative of the credit provider from the client device;
- sending substitute user credentials to the client device over the temporary connection, the substitute user credentials being associated with the original user credentials;
- receiving the substitute user credentials from the visited provider of access;
- authenticating the client device on the basis of the substitute user credentials;
- responsive to successful authentication of the client device on the basis of the substitute user credentials, indicating to the visited provider of access to the data network that the client device has been successfully authenticated.

21. The method defined in claim 20, wherein receiving the original user credentials from the client device is effected over the data network.

22. The method defined in claim 21, wherein receiving the original user credentials is effected via the visited provider of access to the data network.

23. The method defined in claim 20, further comprising, between receiving the original user credentials and sending the substitute user credentials:
- generating the substitute credentials.

24. The method defined in claim 23, further comprising:
- storing the substitute user credentials in a database in association with the original user credentials.

25. The method defined in claim 24, wherein authenticating the client device on the basis of the substitute user credentials comprises accessing the database, wherein the client device is said to be successfully authenticated on the basis of the substitute user credentials if the substitute user credentials are contained in the database.

26. The method defined in claim 25, further comprising, between receiving the original user credentials and sending the substitute user credentials:
- authenticating the client device on the basis of the original user credentials.

27. The method defined in claim 26, wherein authenticating the client device on the basis of the original user credentials comprises accessing a database of authorized users, wherein the client device is said to be successfully authenticated on the basis of the original user credentials if the original user credentials are contained in the database of authorized users.

28. The method defined in claim 27, wherein generating the substitute credentials is performed in response to successful authentication of the client device on the basis of the original user credentials.

29. The method defined in claim 23, wherein the original user credentials comprise a user name, a realm and a password.

30. The method defined in claim 23, wherein the original user credentials comprise a user name and a credit card number.

31. The method defined in claim 23, wherein the original user credentials comprise an account number and a personal identification number.

32. The method defined in claim 23, wherein generating the substitute user credentials comprises deriving the substitute credentials from the original user credentials.

33. The method defined in claim 23, wherein the substitute user credentials comprise data indicative of the substitute nature of the substitute user credentials.

34. The method defined in claim 29, wherein the substitute user credentials comprise data indicative of a realm different from the realm indicated by the original user credentials.

35. A credit provider having a business relationship with a plurality of users, comprising:
- a network server entity adapted to:
  - receive original user credentials from a client device over a temporary connection that passes through a visited provider of network access, the temporary connection being secured to prevent the visited provider of network access from determining the original user credentials transmitted by the client device, the client device being redirected to the credit provider in response to the visited provider of network access receiving a message indicative of the credit provider from the client device;
  - send substitute user credentials to the client device over the temporary connection, the substitute user credentials being associated with the original user credentials;
- an authentication entity adapted to:
  - receive the substitute user credentials from the visited provider of network access;
  - authenticate the client device on the basis of the substitute user credentials;
  - indicate to the visited provider of network access that the client device has been successfully authenticated in response to successful authentication of the client device on the basis of the substitute user credentials.

36. A credit provider having a business relationship with a plurality of users, comprising:
- means for receiving original user credentials from a client device over a temporary connection that passes through a visited provider of access to a data network, the temporary connection being secured to prevent the visited provider of access from determining the original user credentials transmitted by the client device, the client device being redirected to the credit provider in response to the visited provider of access to a data network receiving a message indicative of the credit provider from the client device;
- means for sending substitute user credentials to the client device over the temporary connection, the substitute user credentials being associated with the original user credentials;
- means for receiving the substitute user credentials from the visited provider of access;
- means for authenticating the client device on the basis of the substitute user credentials;
- means for responsive to successful authentication of the client device on the basis of the substitute user credentials, indicating to the visited provider of access to the data network that the client device has been successfully authenticated.

37. A method of accessing a data network from a region of service operated by a visited access provider, comprising
- supplying from a client device to the visited access provider an identity of a credit provider;
- establishing a temporary connection with the credit provider via the visited access provider, the client device being redirected to the credit provider in response to the visited access provider receiving the identity of the credit provider from the client device;

receiving substitute user credentials from the credit provider during the temporary connection in response to supplying the credit provider with original user credentials provider during the temporary connection;

supplying the substitute user credentials to the visited access provider for authentication of the client device by the credit provider on the basis of the substitute user credentials;

wherein the temporary connection is secured to prevent the visited access provider from determining the original user credentials supplied to the credit provider.

38. A method defined in claim 37, wherein supplying the substitute user credentials to the visited access provider is performed automatically in response to receiving the substitute user credentials from the credit provider.

39. A method defined in claim 37, wherein supplying the substitute user credentials to the visited access provider is performed without requiring user input after receiving the substitute user credentials from the credit provider.

40. The method defined in claim 37, further comprising:
accessing the data network via the visited access provider in response to successful authentication of the client device on the basis of the substitute user credentials.

41. The method defined in claim 40, further comprising, prior to supplying to the visited access provider the identity of the credit provider:
receiving from the visited network provider an identity of at least one candidate credit provider including the credit provider.

42. The method defined in claim 41, further comprising:
selecting the credit provider from among the at least one candidate credit provider identified whose identity is received from the visited network provider.

43. The method defined in claim 40, wherein the temporary connection is established over the data network.

44. The method defined in claim 43, wherein the temporary connection is established via the visited access provider.

45. The method defined in claim 44, wherein data sent to a home network during the temporary connection is encrypted at the client device and decrypted at the credit provider.

46. The method defined in claim 45, wherein data sent from the home network during the temporary connection is encrypted at the credit provider and decrypted at the client device.

47. The method defined in claim 37, wherein the temporary connection is a secure socket layer connection.

48. The method defined in claim 37, wherein establishing the temporary connection with the credit provider comprises receiving an Internet Protocol address of the credit provider from the visited access provider and accessing the Internet Protocol address via the Internet.

49. Apparatus for accessing a data network from a region of service operated by a visited access provider, comprising
means for supplying from a client device to the visited access provider an identity of a credit provider;

means for establishing a temporary connection with the credit provider via the visited access provider, the client device being redirected to the credit provider in response to the visited access provider receiving the identity of the credit provider from the client device;

means for receiving substitute user credentials from the credit provider during the temporary connection in response to supplying the credit provider with original user credentials provider during the temporary connection;

means for supplying the substitute user credentials to the visited access provider for authentication of the client device by the credit provider on the basis of the substitute user credentials;

wherein the temporary connection is secured to prevent the visited access provider from determining the original user credentials supplied to the credit provider.

* * * * *